United States Patent [19]

Myer

[11] Patent Number: 5,430,971
[45] Date of Patent: * Jul. 11, 1995

[54] ADJUSTABLE POST OR BOTANICAL COLLAR APPARATUS AND METHOD

[76] Inventor: C. Randolph Myer, 15 Forster Rd., Manchester, Mass. 01944

[ * ] Notice: The portion of the term of this patent subsequent to Jan. 18, 2011 has been disclaimed.

[21] Appl. No.: 276,208

[22] Filed: Jul. 18, 1994

Related U.S. Application Data

[60] Continuation-in-part of Ser. No. 137,664, Oct. 15, 1993, Pat. No. 5,361,536, which is a division of Ser. No. 913,464, Jul. 14, 1992, Pat. No. 5,279,069.

[51] Int. Cl.$^6$ .............................................. A01G 17/00
[52] U.S. Cl. ............................................................ 47/25
[58] Field of Search ........................ 47/25, 25 R, 58.01

[56] References Cited

U.S. PATENT DOCUMENTS

| | | | |
|---|---|---|---|
| 915,897 | 3/1909 | Skorness | 47/25 |
| 2,102,748 | 12/1937 | Racquin | 47/25 |
| 2,263,874 | 11/1941 | Hilleman | 47/25 |
| 2,978,837 | 4/1961 | Daniels | 47/25 |
| 4,858,378 | 8/1989 | Helmy . | |
| 5,279,069 | 2/1994 | Myer . | |

FOREIGN PATENT DOCUMENTS

| | | | |
|---|---|---|---|
| 345743 | 12/1989 | European Pat. Off. | 47/25 |
| 1465465 | 1/1967 | France | 47/25 |
| 3447320 | 7/1986 | Germany | 47/25 |
| 1598076 | 9/1981 | United Kingdom | 47/25 |

Primary Examiner—Henry E. Raduazo
Attorney, Agent, or Firm—Richard P. Crowley

[57] ABSTRACT

An adjustable collar apparatus and method to encircle a post or botanical item at its base, which collar apparatus comprises a plurality of at least three separate, identical, and flat sheet panel elements. Each panel element has a generally arcuate, involute inner edge, a generally arcuate outer edge and first and second side edges, and is characterized by a first slotted opening positioned toward the first side edges and a second slotted opening positioned toward the second side edge. The flat panel sheet elements are arranged in a side-edge, overlapping relationship, with the first opening of one flat panel sheet element aligned with the second opening of an adjacent flat panel sheet element to form a collar apparatus about a post or the base of a botanical item. Fasteners are inserted between the aligned openings of adjacent flat panel sheet elements to permit slidable adjustment of the flat panel sheet elements and to retain the flat panel sheet elements together. One arcuate edge of the flat panel sheet element has a short, upwardly extending rim to form a continuous, peripheral raised rim for the assembled collar apparatus. Each flat panel sheet element includes at least one hole for the insertion of a ground spike to fasten the flat panel sheet element to the ground.

17 Claims, 3 Drawing Sheets

ADJUSTABLE POST OR BOTANICAL COLLAR APPARATUS AND METHOD

This application is a continuation-in-part of patent application U.S. Ser. No. 08/137,664, filed Oct. 15, 1993, now U.S. Pat. No. 5,361,536, issued Nov. 8, 1994, which application was a divisional application of patent application U.S. Ser. No. 07/913,464, filed Jul. 14, 1992, now U.S. Pat. No. 5,279,069, issued Jan. 18, 1994.

BACKGROUND OF THE INVENTION

It is often desirable to eliminate or reduce the growth of grass or weeds about the base of a post, such as a generally upright post, or about the base of a tree or shrub. The elimination of such grass or weeds about the base eliminates the need for trimming the grass or weeds about the base and avoids damage to the base of the post from lawn mowers, weed-cutting apparatuses and the like. The growth of grass or weeds about the base of the post or tree can be controlled by eliminating the sunlight through the employment of a covered area about the base of the post or tree.

A tree- or post-collar apparatus and method which is inexpensive, easily assembled and used and is reusable and which may be adjusted to encircle the post or irregular tree-stem trunk, to eliminate the growth of grass or weeds about the base being covered by the post collar, and which can be expanded to accommodate tree-trunk growth, has been described in U.S. patent application No. 08/137,554, which is incorporated herein by reference.

U.S. Pat. No. 4,858,378, issued Aug. 22, 1989 describes a modular landscape system. The system provides for the masking of a ground surface to prevent unwanted growth, for watering plants from a single location and for containing decorative material about a plant by the use of a radial outer rim.

It is now desired to provide for a collar apparatus which is adapted to contain gravel, mulch, bark, or other particulate or fibrous material in a confined, selected space about the encircled post, tree or shrub base for improved aesthetic appearance and more effective elimination of sunlight.

SUMMARY OF THE INVENTION

The invention concerns an improved collar apparatus for a post or botanical item and a method of encircling the post or botanical item with the collar apparatus.

The collar apparatus of the invention comprises a means to encircle a post or botanical item at its base, which collar apparatus comprises a plurality of at least three separate, identical, flat panel sheet elements generally trapezoidal, each flat panel sheet element having a generally arcuate inner edge, such as an involute curve to form a circular inner opening, and a generally arcuate outer edge and first and second side edges. Each flat panel sheet element is characterized by a first slotted opening, positioned toward the first side edge and extending generally radially between the inner and outer arcuate edges, and a second slotted opening positioned toward the second side edge and extending generally parallel to the inner and outer arcuate edges in the form of a generally radial involute curve.

In use, the flat panel sheet elements are arranged in a side edge, overlapping relationship, with the first opening of one flat panel sheet element generally aligned with the second opening of an adjacent flat panel sheet element to form a collar apparatus about a post or the base of a botanical item. A fastening means is inserted between the aligned openings of adjacent flat panel sheet elements to permit slidable adjustment of the flat panel sheet elements and to fasten the flat panel sheet elements together. The fastening of adjacent flat panel sheet elements is repeated with other flat panel sheet elements until all of the flat panel sheet elements have been assembled and fastened together except for one, creating an opening whereupon the assembled and fastened flat panel sheet elements can be positioned and adjusted to fit snugly about the base of a post or tree; and then fastening the fastening means through the one opening to form an assembled collar apparatus.

Optionally and preferably, the outer or inner, or both, arcuate edge of the flat panel sheet element has a short, upwardly extending rim with the rim length starting slightly inwardly from each end of the outer arcuate edge so as to form, on assembly of the panel elements, a generally continuous peripheral rim with each end slightly overlapping the adjacent rim. After the collar apparatus is so assembled and positioned, gravel, mulch or other particulate or decorative material may be used to fill the collar apparatus, said material being held within the area defined by the short, upwardly extending rim on the outer, inner or both edges of the collar apparatus. The outer arcuate edge of the panel sheet element also has a short lip element extending outwardly from the bottom of the upwardly extending rim and at the same level as the flat panel sheet element. This lip element provides for further anchoring of the flat panel sheet element when dirt or rocks or other particulate material is placed on top of the lip element and around the outer perimeter to secure the lip element to the ground surface.

Each flat panel sheet element includes at least one hole or other holder for the insertion of a ground spike means to fasten or hold the flat panel sheet element to the ground. If desired, the panel element may contain a plurality of openings, holes or slots to permit the watering of the base of the plant, tree or shrub with which the collar apparatus is used.

In one embodiment, the collar apparatus means may be comprised of clear, moldable plastic for decorative purposes or, in a preferred embodiment, is comprised of an opaque, moldable plastic to prevent the penetration of sunlight through the collar apparatus into the ground to prevent or inhibit weed or grass growth. It has been found that a black plastic panel tends to accelerate springtime growth of botanical stems in use due to the absorption of heat into the root system.

The invention will be described for the purposes of illustration only in connection with certain embodiments; however, it is recognized that various changes, modifications, additions and improvements may be made to the illustrated embodiments by those persons skilled in the art, all falling within the spirit and scope of the invention.

DESCRIPTION OF THE EMBODIMENTS

Figure 1:
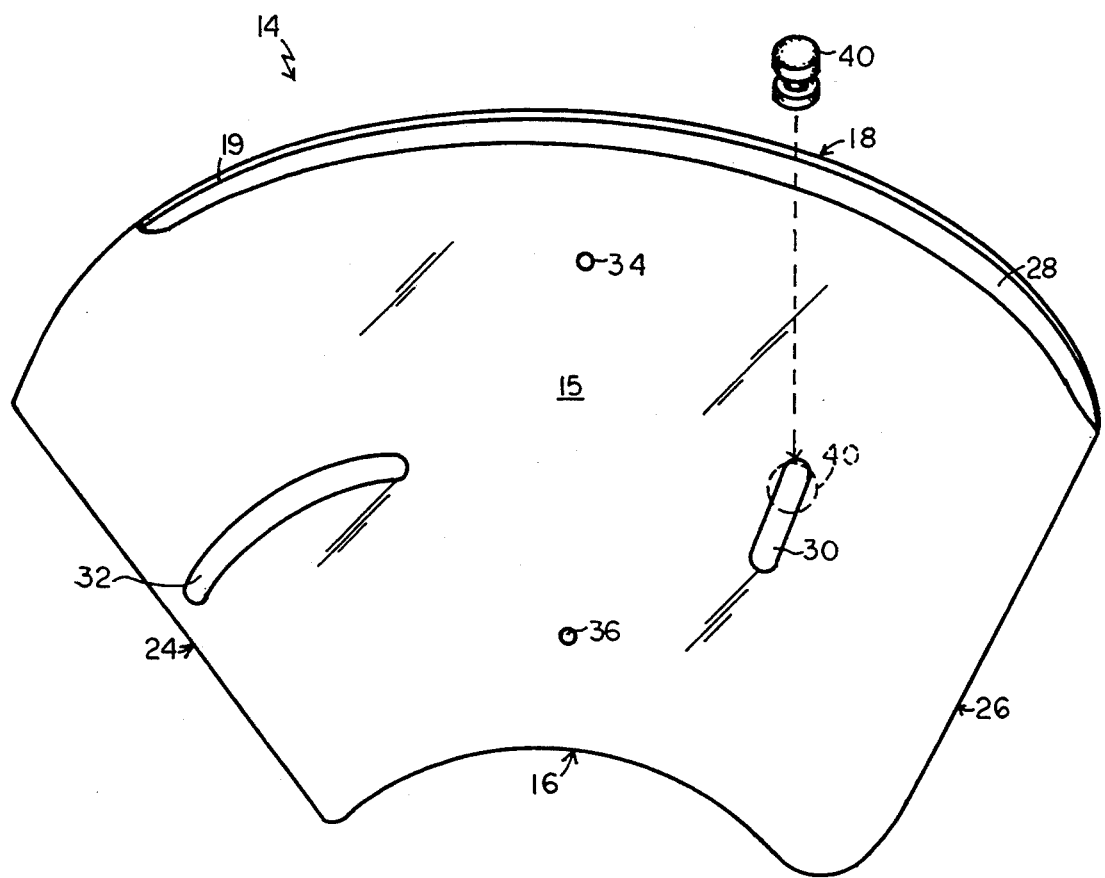
FIG. 1 is a top plan view of a flat panel sheet element of the collar apparatus of the invention with an outer raised rim with a fastener bumper of the invention.

As shown in the drawings, FIG. 1 is a top plan view of the trapezoidal, flat, panel sheet element 14 of the collar apparatus of the invention 10, with trapezoidal flat panel sheet area 15, arcuate involute curved inner edge 16, about 8" in length, arcuate outer edge 18, about 16" in length, and first 26 and second 24 side edges, the first side edge 26 being about 7½" in length, and the second side edge 24 being about 7" in length. The outer arcuate edge 18 has a short, upwardly extending rim 28, starting at one end at the first side edge 26, and at the other end inwardly from the second side edge 24 about 3", and extending upwardly about a minimum of ½", e.g., ⅜". Each end of the upwardly extending rim 28 is tapered downwardly to provide for the overlapping of the rims to form a generally continuous peripheral rim for containing particulate matter. A small lip element 19 extends outwardly from the bottom of the upwardly extending ridge 28 to aid in securing the panel sheets 14 into the ground surrounding the outer perimeter of the assembled apparatus by means of backfilling particulate material onto the lip and securing the assembled sheet elements 14 to the ground. The flat panel sheet element 14 has a first slotted opening 30 positioned about 3" from the first side edge 26 and extending radially between the inner 16 and outer 18 arcuate edges, beginning 3" from the inner arcuate edge and being about 1½" in length, and a second slotted opening 32 positioned toward and near the second side edge 24 and extending about 3½" in length, toward the inner 16 and outer 18 arcuate edges, in the form of a radial curve. The flat panel sheet 14 also has round holes 34 and 36, about 3/16" in diameter, and centrally positioned between the slot openings 30 and 32 for the insertion of one or more ground spikes 42 to fasten the flat panel sheet elements 14 to the ground 50. The holes 34 and 36 also provide for the passage of water into the root area.

Figure 2:
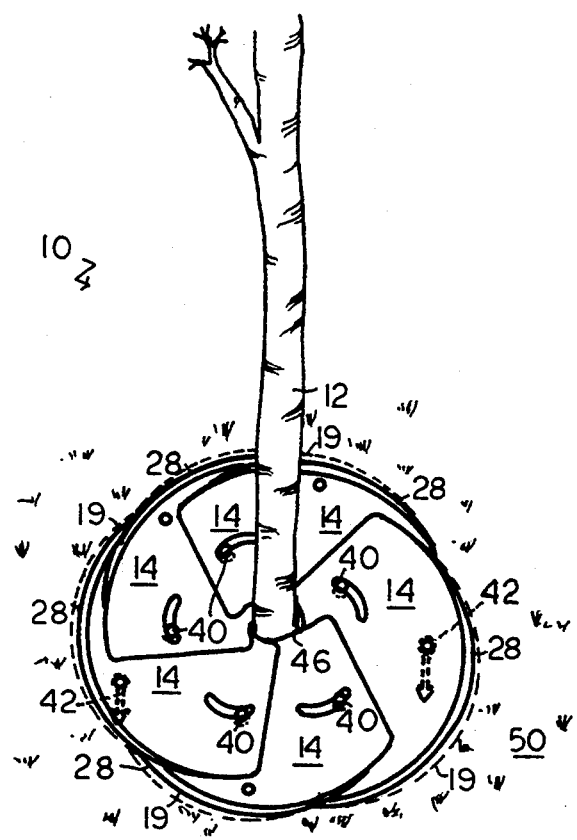
FIG. 2 is a perspective view of an assembled, fastened, collar apparatus with a plurality of the sheet elements of FIG. 1 about the base of a tree.

FIG. 2 shows a perspective view of the assembled collar apparatus 10 with the sheet elements 14 placed in a snug-fit, circular manner about the base of a tree 12 and fastened together with fasteners 40, and secured to the ground 50 with ground spikes 42, both indicated in dotted lines. Inner arcuate edge 16 is positioned close to the tree base, the inner arcuate edges 16 forming a circle 46 snug-fit around the tree base, while outer arcuate edges 18, with upwardly extending rims 28, form a circular pattern and border around the tree base 12. The lip element 19 is indicated in dotted lines around the perimeter of the assembled sheet panel elements 14 with the ground 50 backfilled onto it to provide for further anchoring of the panels.

Figure 3:
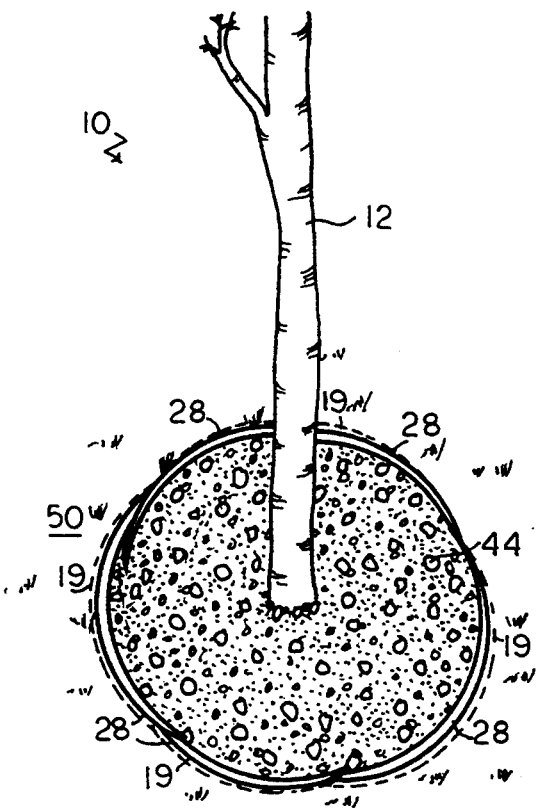
FIG. 3 is a perspective view of an assembled, fastened collar apparatus with the flat panel sheet element of FIG. 1 about the base of a tree and containing decorative particulate material on the top surface, the gravel being confined by the outer rim of the apparatus.

FIG. 3 further depicts the collar apparatus of the invention 10 with the flat panel sheet elements 14 arranged around the base of a tree 12 in a snug-fit, circular manner and secured to each other by fasteners 40 and secured to the ground with ground spikes 42. The upwardly extending rims 28 on the arcuate outer edges 18 are shown containing gravel 44 within the collar apparatus 10 around the tree 12. The lip element 19 is indicated in dotted lines around the perimeter of the assembled sheet panel elements 14 with the ground 50 backfilled onto it to provide for further anchoring of the panels.

Figure 4:
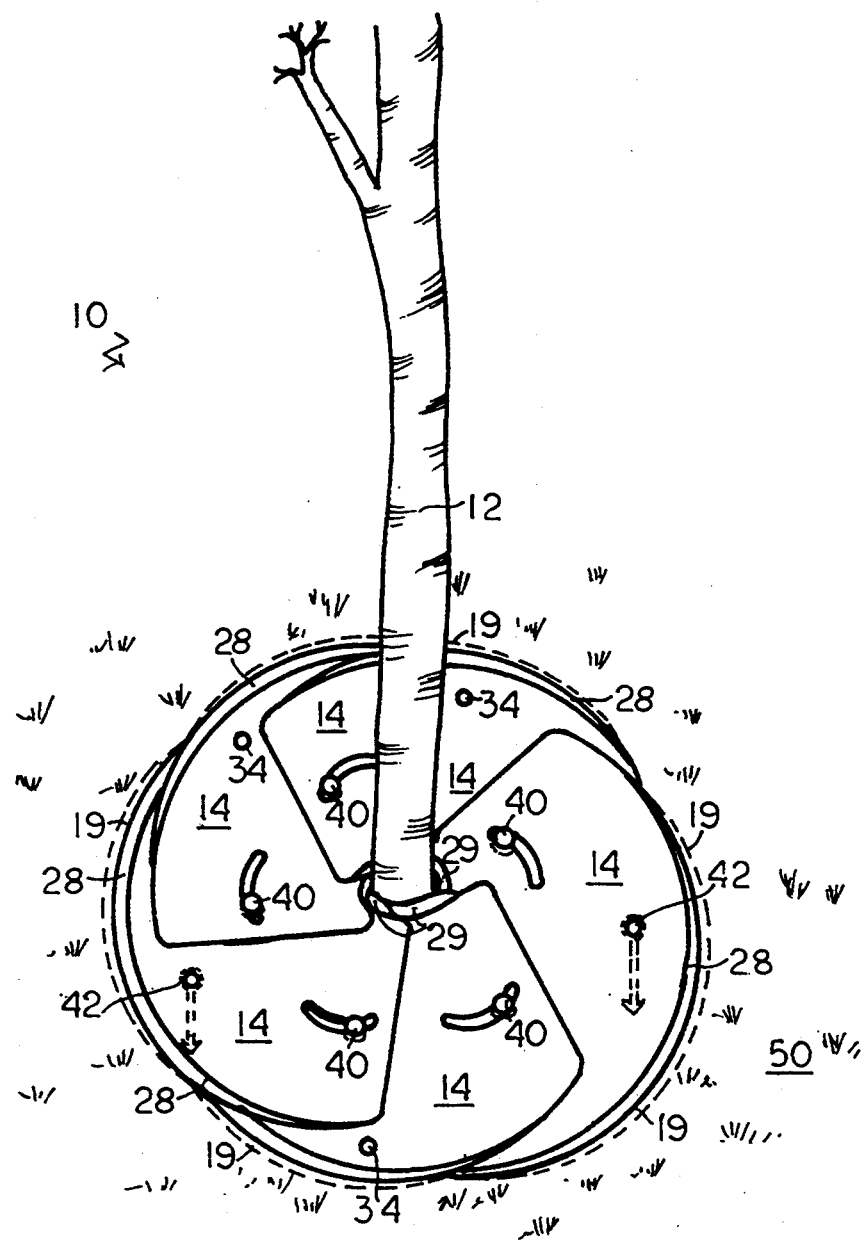
FIG. 4 is an enlarged perspective view of another embodiment of the collar apparatus with inner and outer raised rims.

FIG. 4 is an enlarged perspective view of another embodiment of the invention, showing a perspective view of the assembled collar apparatus 10 with the sheet elements 14 placed in a snug-fit, circular manner about the base of a tree 12 and fastened together with fasteners 40, and secured to the ground 50 with ground spikes 42, both indicated in dotted lines. Inner arcuate edge 16, with an upwardly extending rim 29, similar to rim 28 to provide for additional containment of particulate matter, is positioned close to the tree base, the inner arcuate edges 16 forming a circle 46 snug-fit around the tree base, while outer arcuate edges 18, with upwardly extending rims 28, form a circular pattern and border around the tree base 12. The lip element 19 is indicated in dotted lines around the perimeter of the assembled sheet panel elements 14 with the ground 50 backfilled onto it to provide for further anchoring of the panels.

In use, a plurality of the flat panel sheet elements 14 are aligned with the side edges one on top of the other, with the slots overlapping and secured together by fasteners 40 extending through slot openings 30 and 32 on the respective sheets, with one panel being left unsecured. The plurality of connected sheet panel elements are then spread out and placed about the base of the tree or post that is to be protected. The flat sheet panels 14 are then slidably moved and adjusted respective to each other to form an inner circle 46, or other geometric shapes as desired depending on the number of panels used. The assembled, inner, arcuate edges of the panels form an open circle, which circle or other shape is snugly close or adjacent to the base of the post, tree or shrub, typically with the panels 14 adapted to be spaced generally uniformly, and then a fastener 40 is inserted through the remaining slotted opening of the last overlapping panel 14, to finish the enclosure, all fasteners 40 being sealed by turning and snap-fitting through the openings, to secure the overlapping edges of the panels 14 together in the desired arrangement. The circular holes 34 and 36 on the flat panel sheet 14 may then be employed by means of inserting ground spikes 42 through the holes 34 and 36 to secure the collar apparatus 10 into the ground 50 surrounding the tree or post.

The collar apparatus may be removed, when no longer required, by releasing or snapping out the fasteners 40 in one of the panels and reused by rearranging, subtracting or adding panels according to the desired use. When fewer flat panels are used, the geometric shape may be of a rectangular, square or even triangular shape. When disassembled, the flat panel sheets of the collar apparatus of the invention can be easily stacked one on top of the other for easy storage, and compact packaging of the collar apparatus for purchase by a user.

The adjustable collar apparatus, as described and illustrated in the drawings, thereby provides for a simple, effective, easily packaged and stored, adjustable means and method to encircle a post, tree or shrub and to eliminate the need to trim grass or weeds along the protected and encircled area, and improved protection and aesthetic appearance by enabling the user to fill the post collar apparatus with gravel, mulch or other particulate matter.

What is claimed is:

1. An adjustable collar apparatus to encircle a post or botanical item at its base, which collar apparatus comprises;

a) a plurality of at least three separate, identical, and generally trapezoidal flat panel sheet elements;
b) each flat panel sheet element having a generally arcuate inner edge, a generally arcuate outer edge and first and second side edges;
c) each flat panel sheet element characterized by;
  i) a first slotted opening positioned toward the first side edge and extending generally radially between the inner and outer arcuate edges; and
  ii) a second slotted opening positioned toward the second side edge and extending generally parallel to the inner and outer arcuate edges in the form of a generally radial curve;
d) the flat panel sheet elements arranged in a side edge overlapping relationship with the first opening of one flat panel sheet element generally aligned with the second opening of an adjacent flat panel sheet element to form a collar apparatus about the post or the base of a botanical item; and
e) fastening means inserted between the aligned openings of adjacent flat panel sheet elements to permit slidable adjustment of the flat panel sheet elements and to retain the flat panel sheet elements together.

2. The collar apparatus of claim 1 which includes at least one hole in each flat panel sheet element for the insertion of a ground spike means to fasten the flat panel sheet element to the ground.

3. The collar apparatus of claim 1 wherein the inner arcuate edge of each panel comprises an involute curve to form a generally circular inner opening about the post or botanical stem.

4. The collar apparatus of claim 1 wherein each flat panel sheet element includes two separate, generally radially positioned, spaced apart, generally circular holes between the first and second openings.

5. The collar apparatus of claim 2 which includes a means to fasten the flat panel sheet element to the ground.

6. The collar apparatus of claim 1 wherein the flat panel sheet element includes a short, upwardly extending rim from at least one arcuate edge and substantially the length of the arcuate edge to form an assembled collar apparatus with a generally continuous peripheral rim about the arcuate edge.

7. The collar apparatus of claim 6 wherein the outer arcuate edge of the flat panel sheet element has a short, upwardly extending rim, with the rim length starting inwardly from each end of the outer arcuate edge.

8. The collar apparatus of claim 1 wherein the inner arcuate edge of each flat panel sheet element is chamfered at one end and rounded at the other end.

9. The collar apparatus of claim 7 wherein the upwardly extended rim extends from one end of the outer or inner arcuate edge having the first slotted opening substantially toward but not to the other end of the outer or inner arcuate edge.

10. The collar apparatus of claim 1 wherein the fastener means comprises a two headed, flexible fastener, each head connected by a small diameter connector, at least one head of sufficient size to be snap-fit inserted in the first and second opening to retain adjacent flat panel sheet elements in an overlapping, slidably adjustable position.

11. The collar apparatus of claim 6 wherein the flat panel sheet elements are opaque, molded, plastic elements.

12. In combination, a post or botanical item having a base extending generally upright and the collar apparatus of claim 6 on the ground encircling the post or base.

13. The combination of claim 12 which includes decorative-type material on a top surface of the collar apparatus and contained by the rim of the arcuate edge.

14. An adjustable collar apparatus to encircle a post or botanical item at its base, which collar apparatus comprises:
a) a plurality of at least three separate, identical, and generally trapezoidal flat sheet panel elements;
b) each flat panel sheet element having a generally arcuate involute, curved inner edge, a generally arcuate outer edge and first and second side edges;
c) each flat panel sheet element characterized by;
  i) a first slotted opening positioned toward the first side edges and extending generally radially between the inner and outer arcuate edges; and
  ii) a second slotted opening positioned toward the second side edge and extending generally parallel to the inner and outer arcuate edges in the form of a radial curve;
d) the flat panel sheet elements arranged in a side edge overlapping relationship with the first opening of one flat panel sheet element generally aligned with the second opening of an adjacent flat panel sheet element to form a collar apparatus about the post or the base of a botanical item;
e) fastening means inserted between the aligned openings of adjacent flat panel sheet elements to permit slidable adjustment of the flat panel sheet elements and to retain the flat panel sheet elements together;
f) the flat panel sheet element wherein the outer arcuate edge has the short, upwardly extending rim to form a generally continuous peripheral overlapping rim in the assembled collar apparatus; and
g) each flat panel sheet element which includes at least one hole for the insertion of a ground spike means to fasten the flat panel sheet element to the ground.

15. In combination, a post or botanical item having a base extending generally upright and the collar apparatus of claim 14 closely encircling the post or base.

16. The combination of claim 15 which includes particulate-type gravel or fibrous mulch material on a top surface of the collar apparatus and contained within the rim of the outer arcuate edge.

17. A method to encircle the base of a post or botanical item having a base with a collar apparatus, which method comprises:
a) providing a collar apparatus having a plurality of at least three separate, identical, and generally trapezoidal flat panel sheet elements, each flat panel sheet element having a generally arcuate inner edge, a generally arcuate outer edge and first and second side edges, and characterized by;
  i) a first slotted opening positioned toward the first side edge and extending generally radially between the inner and outer arcuate edges; and
  ii) a second slotted opening positioned toward the second side edge and extending generally parallel to the inner and outer arcuate edges in the form of a generally radial curve;
b) arranging the flat panel sheet elements in a side edge overlapping relationship with the first opening of one flat panel sheet element generally aligned with the second opening of an adjacent flat panel sheet element;

c) inserting a fastening means into an opening of the flat panel sheet element;

d) overlapping the selected opening with the fastening means over the opening of an adjacent flat panel sheet element to permit slidable adjustment of the flat panel sheet elements;

e) inserting the fastening means through the overlapping opening to fasten both flat panel sheet elements together;

f) repeating steps c), d), and e) with other flat panel sheet elements until all of the flat panel sheet elements have been assembled and fastened together except for one opening;

g) placing the assembled and fastened flat panel sheet elements about the base of the post, tree or shrub;

h) adjusting the assembled and fastened flat panel sheet elements snugly about the base of the post, shrub or tree; and i) fastening the fastening means through the one opening to form an assembled collar apparatus.

* * * * *